United States Patent
Inamdar et al.

(10) Patent No.: US 12,526,193 B2
(45) Date of Patent: Jan. 13, 2026

(54) PROVIDING DYNAMIC USER-BEHAVIOR-AWARE POLICIES IN SOFTWARE DEFINED WIDE AREA NETWORKS

(71) Applicant: Cisco Technology, Inc., San Jose, CA (US)

(72) Inventors: Amjad Inamdar, Karnataka (IN); Syed Arslan Ahmed, Karnataka (IN); Raj Venkatesan, Mill Valley, CA (US); Ankur Bhargava, Pleasanton, CA (US); Ashish Sood, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 18/639,694

(22) Filed: Apr. 18, 2024

(65) Prior Publication Data

US 2025/0330380 A1   Oct. 23, 2025

(51) Int. Cl.
*G06F 15/173*    (2006.01)
*H04L 41/0893*    (2022.01)
*H04L 41/0894*    (2022.01)
*H04L 43/026*    (2022.01)

(52) U.S. Cl.
CPC ...... *H04L 41/0893* (2013.01); *H04L 41/0894* (2022.05); *H04L 43/026* (2013.01)

(58) Field of Classification Search
CPC ............. H04L 41/0893; H04L 41/0894; H04L 43/026
See application file for complete search history.

(56) References Cited

U.S. PATENT DOCUMENTS

| | | | |
|---|---|---|---|
| 11,481,709 B1* | 10/2022 | Liao | G06Q 10/0635 |
| 2015/0271043 A1 | 9/2015 | Htay et al. | |
| 2015/0326528 A1 | 11/2015 | Murthy et al. | |
| 2018/0375884 A1* | 12/2018 | Kopp | G06F 21/552 |
| 2020/0229206 A1 | 7/2020 | Badic et al. | |

(Continued)

OTHER PUBLICATIONS

Search Report and Written Opinion for International Application No. PCT/US25/24933, Dated Jun. 18, 2025, 14 pages.

*Primary Examiner* — Joseph R Maniwang
(74) *Attorney, Agent, or Firm* — Lee & Hayes, P.C.

(57) ABSTRACT

This disclosure describes techniques and mechanisms for enabling and enforcing user behavior aware policies within an enterprise network. The techniques include receiving flow data and learning network traffic patterns and user behavior patterns of user(s) of the network. The techniques map user(s) to behavior group(s) based on forecast(s) and historical data of network conditions and/or user behavior patterns. The techniques monitor the flow data and dynamically re-map user(s) to new behavior group(s) based on real-time user behavior and/or real-time network conditions. Mapping(s) and/or updated mapping(s) and user behavior aware policies may be sent to edge device(s) for enforcement. The edge device(s) may dynamically prioritize a link, de-prioritize a link, block traffic, drop traffic etc. for user(s). The techniques may extend application aware and user aware routing policies to account for dynamic user behavior and network conditions, provide improved application experience and network utilization.

20 Claims, 6 Drawing Sheets

(56) References Cited

U.S. PATENT DOCUMENTS

2021/0369309 A1 12/2021 Olofsson et al.
2023/0231768 A1 7/2023 Vysotsky et al.
2023/0262525 A1 8/2023 Gangadharan et al.
2024/0039956 A1 2/2024 Sundararajan et al.

* cited by examiner

PROVIDING DYNAMIC USER-BEHAVIOR-AWARE POLICIES IN SOFTWARE DEFINED WIDE AREA NETWORKS

TECHNICAL FIELD

The present disclosure relates generally to the field of computer networking, and more particularly to for providing and enforcing user-behavior-aware routing policies in SD-WAN based on the dynamic behavior of users and network conditions.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is an enterprise network that utilizes a software defined wide area network (SD-WAN). As Enterprise routing solutions have evolved, the routing policies and path-selection polices have also evolved to application aware policies and user aware policies. Application aware policies and user aware policies have enabled application aware routing (AAR) techniques, which provides for prioritization of particular applications based on the defined policies, as well as best path selection. AAR has been extended to incorporate user aware policies. In SD-WAN, user-aware policies incorporate user awareness to the already application aware policies. For instance, the user aware policies may assign user identifiers to different groups of users (e.g., departments (accounting, marketing, research, human resources, etc.) within the enterprise network. The user aware policies may identify one group of users as having preferential treatment over another group of users. Thus, AAR can be based on critical application traffic, as well as user context (identity and role(s) within an enterprise).

However, user-aware policies are static in nature and apply to the user groups defined within the policies. For instance, user aware policies may identify a group of users that is allocated an amount of bandwidth within the SD-WAN. One user may disproportionately utilize the allocated amount of bandwidth, which is meant for the group of users. Thus, behavior of a single user or multiple users (e.g., hogging the bandwidth), may result in the application experience of the other users in the group being negatively impacted, resulting in delays, packet loss, and poor network quality for the users within the group.

Accordingly, there is a need to provide policies that intelligently and dynamically account for user behavior and network conditions within a SD-WAN.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
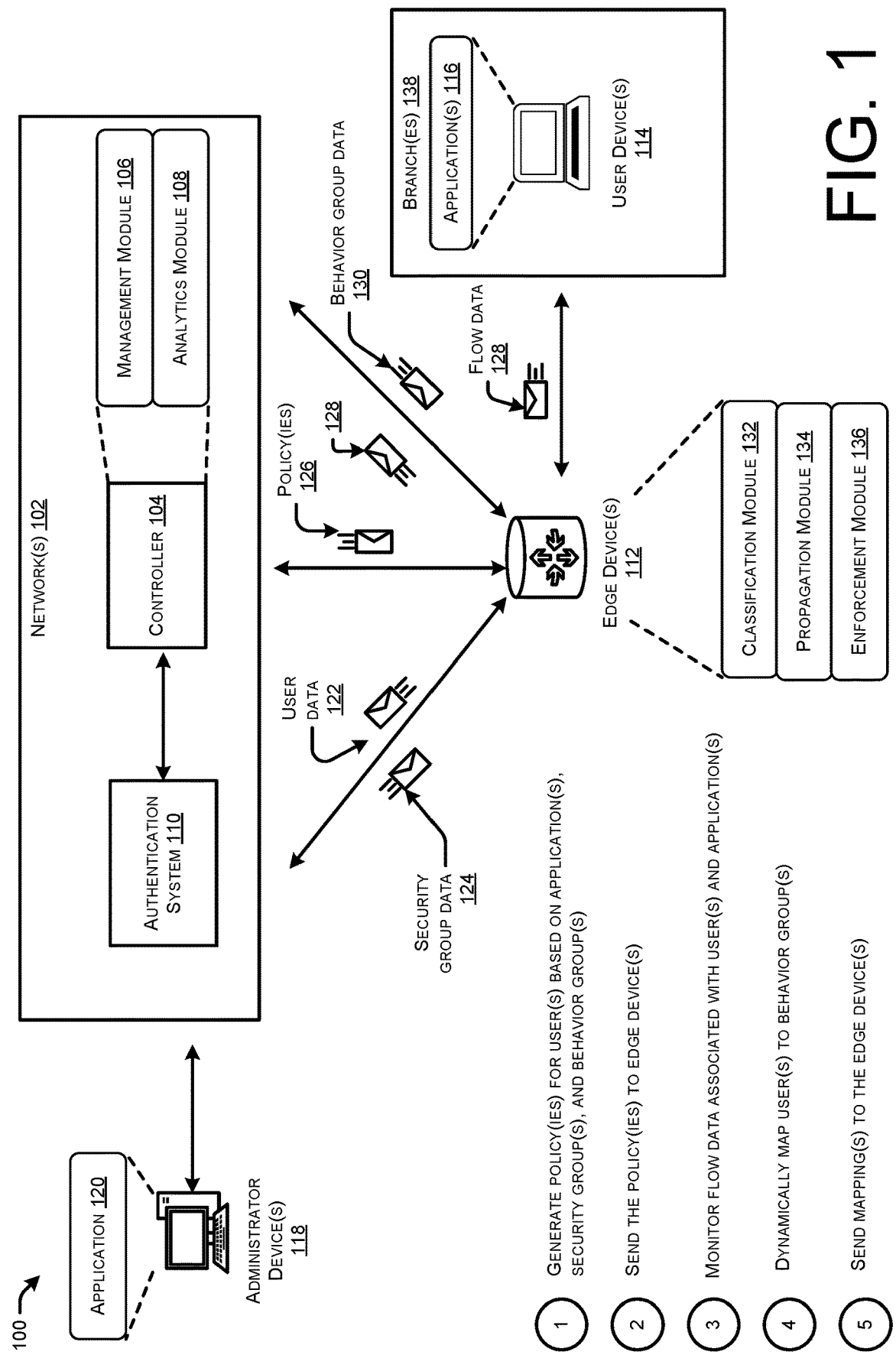
FIG. 1 illustrates a system-architecture diagram of an environment in which a system can provide dynamic user behavior aware policies in SD-WANs using behavior groups.

The present disclosure relates generally to the field of computer networking, and more particularly to providing and enforcing user-behavior-aware routing policies in SD-WAN based on the dynamic behavior of users and network conditions.

A method for providing dynamic user behavior aware policies in SD-WAN is described herein. The method may include receiving flow data received from the one or more edge devices of a network, the flow data being associated with a plurality of users. The method may also include determining, based at least in part on the flow data, a user of the plurality of users as being associated with a first behavior group, the user also being associated with an identity group. The method may include monitoring the flow data associated with the plurality of users within the network. Additionally, the method may include determining, based at least in part on monitoring the flow data, that behavior of the user corresponds to a second behavior group. Further, the method may include assigning, based at least in part on determining the behavior corresponds to the second behavior group, the user to the second behavior group. The method may include sending, to the one or more edge devices, a message indicating the user is assigned to the second behavior group.

Another method for enforcing dynamic user behavior aware policies in SD-WANs using behavior groups is described herein. The method may include receiving, by an edge device, one or more policies associated with user devices accessing a network, the one or more policies defining one or more identity groups and one or more behavior groups. The method may include determining, by the edge device, an identity group associated with a user device. The method may also include identifying, by the edge device, a behavior group associated with the user device. identifying, by the edge device, a policy of the one or more policies to a link associated with the user device based on the identity group and the behavior group. The method may further include enforcing, by the edge device and based on the policy, the policy to the link.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is an enterprise network that utilizes a software defined wide area network (SD-WAN). As Enterprise routing solutions have evolved, the routing policies and path-selection polices have also evolved to application aware policies and user aware policies. Application aware policies and user aware policies have enabled application aware routing (AAR) techniques, which provides for prioritization of particular applications based on the defined policies, as well as best path selection. AAR has been extended to incorporate user aware policies. In SD-WAN, user-aware policies incorporate user awareness to the already application aware policies. For instance, the user aware policies may assign user identifiers to different groups of users (e.g., departments (accounting, marketing, research, human resources, etc.) within the enterprise network. The user aware policies may identify one group of users as having preferential treatment over another group of users. Thus, AAR can be based on critical application traffic, as well as user context (identity and role(s) within an enterprise). Accordingly, extending AAR to incorporate user aware policies enables preferential treatment to critical applications and groups of users, such as QoS priority queuing, DSCP marking for preferential treatment by WAN providers, better WAN link selection, etc.

However, user-aware policies are static in nature and apply to the user groups defined within the policies. For instance, user aware policies may identify a group of users that is allocated an amount of bandwidth within the SD-WAN. One user may disproportionately utilize the allocated amount of bandwidth, which is meant for the group of users. Thus, behavior of a single user or multiple users (e.g., hogging the bandwidth), may result in the application experience of the other users in the group being negatively impacted, resulting in delays, packet loss, and poor network quality for the users within the group. Further, a user's behavior may change. For instance, a first user may initially overutilize the bandwidth for the group for a period of time (e.g., such as by using real-time application(s) (e.g., video calls, conference application, etc.). The first user may stop overutilizing the bandwidth, but another user may start overutilizing it, such as during peak hours for the network. Thus, as the user aware policies are static, a single user (or a couple of users) can essentially hog the bandwidth allocated for the entire group, resulting in poor network and application experience quality for the other users within the group. Thus, the efficacy of the application aware policies and user aware policies are reduced, and the purpose of implementing the application aware policies and user aware policies (e.g., providing better network connections, user experience, application quality, reduce delays, etc.) may be defeated.

Accordingly, there is a need to provide policies that intelligently and dynamically account for user behavior and network conditions within a SD-WAN.

This disclosure describes systems and mechanisms for providing dynamic user behavior aware policies in SD-WAN. In some examples, the system may receive flow data received from the one or more edge devices of a network, the flow data being associated with a plurality of users. The system may determine, based at least in part on the flow data, a user of the plurality of users as being associated with a first behavior group, the user also being associated with an identity group. The system may monitor the flow data associated with the plurality of users within the network.

Additionally, the system may determine, based at least in part on monitoring the flow data, that behavior of the user corresponds to a second behavior group. The system may assign, based at least in part on determining the behavior corresponds to the second behavior group, the user to the second behavior group. The system may also send, to the one or more edge devices, a message indicating the user is assigned to the second behavior group.

This disclosure also describes systems and mechanisms for enforcing dynamic user behavior aware policies in SD-WANs using behavior groups. In some examples, the system may receive, by an edge device, one or more policies associated with user devices accessing a network, the one or more policies defining one or more identity groups and one or more behavior groups. The system may determine, by the edge device, an identity group associated with a user device. The system may identify, by the edge device, a behavior group associated with the user device. The system may also identify, by the edge device, a policy of the one or more policies to a link associated with the user device based on the identity group and the behavior group. Additionally, the system may enforce, by the edge device and based on the policy, the policy to the link.

In some examples, the system may receive flow data for a plurality of applications for multiple networks and/or multiple tenants (e.g., customers of a service provider, such as enterprise customer(s), organization(s), individual(s), or any other suitable tenant). Accordingly, the system may receive, collect, and monitor telemetry data for applications from network(s) with different policies, prioritizations, geographic locations, etc.

In some examples, the flow data may comprise one or more application characteristics and/or network characteristics. The application characteristics may comprise one or more of flow telemetry (e.g., an application identifier, flow count—how many flows is the application creating, bytes, octets, bandwidth requirements, a number of users that access the application, drops, event(s) associated with the drops, DSCP markings); interface data (e.g., bandwidth utilization, total octets, packet(s), maximum supported line rate, tail drops, etc.); link characteristics (e.g., internet service provider (ISP) name, purchased bandwidth or available maximum bandwidth, link type (e.g., MPLS, Internet, LTE, etc.), geographic region, etc.); quality of service (QOS) prioritization requirements (e.g., low latency queuing, bandwidth reservation, etc.); application quality metrics (e.g., application performance index, application telemetry, application feedback, etc.); and/or any other suitable data or characteristic.

In some examples, the system may receive the flow data from a plurality of applications and/or a plurality of edge device(s) associated with an enterprise network. In some examples, the edge device(s) (e.g., such as routers) and/or network device(s) (e.g., switches, routers, servers, etc.) may be configured to classify, propagate, and enforce policy(ies). In some examples, the policy(ies) may comprises application aware policies, user aware policies (also referred to herein as "identity aware policies"), and/or user behavior aware policies. In some examples, the policy(ies) may be one or more separate policy(ies). In some examples, application aware, user aware, and user behavior aware policies may be integrated as part of a single policy.

In some examples, the system comprises a management module. In some examples, the management module may correspond to Cisco's vManage feature. In some examples, the management module is configured to define one or more policies associated with a network. For instance, the management module may be configured to define one or more application aware policies, application and identity aware policies, and/or application, identity, and behavior aware policies. For instance, the management module may be configured to enable a user to define application aware policies. For instance, the user may define values for SLA characteristics (e.g., loss, latency, jitter (e.g., variable delay), etc.) for use when selecting best path options for application traffic flows. Additionally, a user may identify particular application(s) as critical applications, such that they are given higher priority when selecting links within the network.

The management module may be configured to define identity aware policies. Identity aware polices may be configured to specify groups of user(s) within a network to apply bandwidth usage and/or security policies to. For instance, a first group of users may correspond to an accounting group and a second group of users may correspond to a management group. The security policies, application access policies, and bandwidth usage policies for the first group may differ from the security policies, application access policies, and bandwidth policies applied to the second group. In some examples, the management module is configured to define identity aware policies for Cisco's SD-WAN, such as via vManage. As noted above, identity aware policies may define identity tags (e.g., such as SGT tags) associated with each group.

The management module may further be configured to define behavior groups. For instance, the user behavior groups may be defined as part of a user behavior aware policy. User behavior aware policies may define one or more behavior groups associated with behavior patterns of users within groups defined by the user aware policies. For instance, an administrator of the enterprise network may define, for users identified as belonging to the accounting department, two behavior groups associated with behavior patterns of individual users. The user behavior aware policies may further define restrictions associated with bandwidth usage, etc., based on the behavior group the user is mapped into, network traffic patterns (e.g., whether it is peak hours of user or not), or any other parameter. In some examples, user behavior groups may comprise compliant user(s) and non-compliant user(s). In some examples, user behavior groups may comprise compliant user(s) during peak hours, compliant user(s) during non-peak hours, non-compliant user(s) during peak hours, and non-compliant users during non-peak hours. It is understood that any type of behavior group may be defined by a network administrator, such that the techniques described herein are not limited to the examples described.

In some examples, the management module may be configured to send the policies to devices (e.g., edge devices, network devices, etc.) within the network.

In some examples, the system comprises an analytics module. In some examples, the analytics module may comprise an analytics engine. In some examples, the analytics module may correspond to Cisco's vAnalytics feature. In some examples, the analytics module is configured to collect the telemetry data and learn network patterns, traffic patterns, and application characteristics for a plurality of applications across a plurality of networks. For instance, the analytics module may utilize the telemetry data to learn the application characteristics of a particular application. In some examples, the analytics module may also utilize network data (e.g., topology, policy information, etc.) or any other suitable data.

In some examples, the analytics module may be configured to learn network characteristics associated with an SD-WAN. For instance, the network characteristics may comprise a usage pattern and seasonality (e.g., such as a usage heatmap, periodicity of use across day, week, month, etc.) of an enterprise network. Network characteristics may include, but are not limited to application bandwidth requirement per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which this application behaves most optimally.

In some examples, the analytics module may be configured to learn bandwidth usage patterns of each user of the network. For instance, the analytics module may be configured to learn what application(s) a particular user accesses, how much bandwidth the particular user requires, whether the user is accessing application(s) during peak hour(s), whether the user is accessing application(s) required to perform their role or for personal use, etc.

In some examples, the analytics module may be configured to map a particular user into a behavior group. For instance, the analytics module may be configured to determine that a particular user is behaving in a compliant manner during peak hours of network use. The analytics module may push a mapping of the user IP address to the corresponding behavior-group tag to the edge device associated with the user. In some examples, the analytics module may determine that a user's behavior has changed. For instance, the analytics module may determine that a user associated with a compliant user during peak hours behavior group is accessing applications and/or utilizing an amount of bandwidth associated with a non-compliant user during peak hours behavior group. In this example, the analytics module may dynamically update the behavior group associated with the user identifier and push the updated mapping to the edge device in real-time. Accordingly, the analytics module may perform an analysis of the bandwidth usage pattern of each user, apply predictive analytic metrics, and determine forecasts or tends based on historical data of not just the user bandwidth usage but also about the overall traffic conditions such as peak hours of use. The analytics module may use the forecasts to initially map a user to a behavior group and/or to dynamically re-assign the user between behavior groups.

In some examples, the analytics module may generate model(s) of application(s) and/or user behavior based on the flow data. In some examples, the model(s) may correspond to application behavior of the application as a whole and/or one or more flows, and/or user behavior associated with use of applications, network bandwidth usage, and/or overall network conditions.

In some examples, the analytics module may comprise one or more pre-trained models and/or pre-trained weighted models. In some examples, the artificial intelligence models are pre-trained using machine learning techniques. In some examples, the change window system may store machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc., statistical models, etc. As used herein, the terms "machine learning," "machine-trained," and their equivalents, may refer to a computing model that can be optimized to accurately recreate certain outputs based on certain inputs.

Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully-connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

In some examples, the models may be updated and/or re-trained in real-time. For instance, the system may update the models based on real-time flow data received across networks and/or across tenants. Accordingly, the system may provide more accurate modeling of behavior of a user in a plurality of different conditions, environments, locations, etc.

In some examples, the system comprises an authentication system. In some examples, the authentication system corresponds to an authentication, authorization, and access engine, such as Cisco's Identity Services Engine (ISE). In some examples, the authentication system is configured to receive user data (e.g., such as user credentials when accessing an enterprise network) from the user device and/or via an edge device. The authentication system may authenticate the user data by comparing the user data to data stored by the authentication system. Where the user data matches, the authentication system may assign an identity tag to the user based on a role and/or group associated with the user and identified by the authentication system. In some examples, identity tags correspond to Security Group Tags (SGTs). In some examples, the authentication system may assign the identity tag based on context, such as user device type, security posture, user location, etc. For instance, a user within a management department of an enterprise network may be assigned an identity tag that associates the user device with the management group. The authentication system may send a message to an edge device associated with the user device. The message may comprise the mapping between the user device and the identity tag. For instance, the message may comprise a mapping between an IP address of the user device and the identity tag. The message may further indicate the user data has been authenticated and the user device may access the network.

In some examples, edge device(s) may comprise one or more of a classification module, propagation module, and/or an enforcement module. In some examples, the classification module, the propagation module, and/or the enforcement module may correspond to Cisco's Trustsec and/or Cisco SD-WAN.

In some examples, the classification module is configured to authenticate the user with the authentication system. For instance, the classification module may authenticate the user of a user device when the users are admitted into the network (e.g., such as by using 802.X or Remote-Access). As noted above, the authentication engine may assign each user an identity tag based on the users' authenticated identity (e.g., role within an organization, job functionalities, etc.) and/or context. The classification module may be configured to receive and store the mappings of user device identifiers, identity tags, and/or behavior group tags.

In some examples, the edge devices may comprise a propagation module. In some examples, the propagation module may be implemented on any network device (e.g., switches, firewalls, etc.) within the network. In some examples, the propagation module is configured to include the assigned identity tag (e.g., SGT tag) in packets of flow data that are originated by the user device of the user.

In some examples, the propagation module may further be configured to include an assigned behavior group (e.g., user device identifier to behavior group mappings, such as user-IP address to behavior group tags) within packets of the flow data.

In some examples, the edge device(s) may comprise an enforcement module. In some examples, the propagation module may be implemented on any network device (e.g., switches, firewalls, etc.) within the network. In some examples, the enforcement module is configured to enforce security policies and routing polices based on the identity tag (e.g., SGT). For instance, the enforcement module may utilize SGT-aware access-lists, SGT-aware firewalls, SGT-aware Policy Based Routing (PBR), and SGT-aware SD-WAN policies.

In some examples, the edge device(s) may enforce the app-aware and identity-aware policies using the user device identifier (e.g., user-IP address) to identity tag (e.g., SGT tag) mapping from the authentication system and/or from the identity tag included in packet(s) of the flow data. In some examples, the edge device(s) may enforce the behavior aware policies using the user device identifier to behavior group mapping(s) received and/or updated from the system. For instance, the edge device(s) may apply a user behavior aware policy associated with the user-IP address to behavior group mapping to cause user traffic associated with the user device to be dropped, allowed over a best path, diverted to a best-effort path, etc.

In this way, the system may extend application aware and identity aware policies to incorporate user behavior aware policies, thereby providing finer granularity to AAR and identity aware routing techniques. Moreover, the system may intelligently and dynamically map user(s) to different behavior group(s), such that behavior of the user can no longer detrimentally impact other user(s) within a particular identity group. That is, the system may apply dynamic user behavior and the current network traffic conditions, network traffic forecast to user(s) and, based on the user behavior aware policies, cause user traffic to be dropped, allowed over best path, or diverted to best-effort path. In this way, the system provides improved network and application experience to user(s) within identity groups by preventing the behavior of one or few users from negatively impacting application quality, network quality, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can provide dynamic user behavior aware policies in SD-WANs using behavior groups. While the system 100 shows an example controller 104, it is understood that any of the components of the system may be implemented on any device associated with the network 102 and/or any cloud-based service provider.

In some examples, the system 100 may include network(s) 102 that include edge device(s) 112. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs) —both centralized and/or distributed, SD-WANs, SDNs—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise controller 104. In some examples, the controller 104 corresponds to a system that has complete visibility into the fabric of a given network. In some examples, the controller 104 may comprise a controller, one or more processors, memory etc. In some examples, the controller 104 may be integrated as part of one or more of Cisco's vAnalytics feature, Cisco's vManage feature, and/or included in a SD-WAN architecture.

The system 100 may comprise authentication system 110. While authentication system 110 is shown as separate from controller 104, in some examples, the authentication system 110 may be integrated as part of controller 104 and/or any network device of network(s) 102. In some examples, the authentication system 110 corresponds to an authentication, authorization, and access engine, such as Cisco's Identity Services Engine (ISE). In some examples, the authentication system is configured to receive user data (e.g., such as user credentials when accessing an enterprise network) from the user device and/or via an edge device. The authentication system may authenticate the user data by comparing the user data to data stored by the authentication system. Where the user data matches, the authentication system 110 may assign an identity tag to the user based on a role and/or group associated with the user and identified by the authentication system 110. In some examples, identity tags correspond to Security Group Tags (SGTs). In some examples, the authentication system may assign the identity tag based on context, such as user device type, security posture, user location, etc. For instance, a user within a management department of an enterprise network may be assigned an identity tag that associates the user device with the management group. The authentication system may send a message to an edge device associated with the user device. The message may comprise the mapping between the user device and the identity tag. For instance, the message may comprise a mapping between an IP address of the user device and the identity tag. The message may further indicate the user data has been authenticated and the user device may access the network.

The controller 104 may comprise management module 106. In some examples, the management module may correspond to Cisco's vManage feature. In some examples, the management module is configured to define one or more policies associated with a network. For instance, the management module may be configured to define one or more AAR policies, identity aware routing policies, and/or user behavior aware routing policies. In some examples, the management module may be configured to send the policies to devices (e.g., edge devices, network devices, etc.) within the network 102 and/or to branches 138.

The controller 104 may comprise analytics module 108. In some examples, the analytics module 108 may comprise an analytics engine. In some examples, the analytics module may correspond to Cisco's vAnalytics feature. In some examples, the analytics module 108 is configured to collect flow data. In some examples, the analytics module may be configured to learn bandwidth usage patterns of each user of the network. For instance, the analytics module may be configured to learn what application(s) a particular user accesses, how much bandwidth the particular user requires, whether the user is accessing application(s) during peak hour(s), whether the user is accessing application(s) required to perform their role or for personal use, etc. For instance, the analytics module 108 may identify a particular user, a particular application, etc. using flow data 128.

In some examples, the analytics module 108 may be configured to map a particular user into a behavior group. For instance, the analytics module 108 may be configured to determine that a particular user is behaving in a compliant manner (e.g., such that the user does not violate any security policy, AAR policy, identity aware policy, or any other network policy) during peak hours of network use. In this example, the analytics module 108 may determine that the behavior of the user meets the requirements of a behavior group, such as compliant users during peak hours. The analytics module 108 may push a mapping of the user IP address associated with a user device 114 of the user to the corresponding behavior group tag to the edge device 112 accessed by the user. In some examples, the analytics module 108 may determine that the particular user's behavior has changed. For instance, the analytics module 108 may determine that the user who was associated with a compliant user during peak hours behavior group is now violating a policy (e.g., such as by accessing applications and/or utilizing a disproportionate amount of bandwidth allocated to the user's identity group) and that the behavior is occurring during peak hours of use for the network 102. The analytics module 108 may determine the user's behavior corresponds to a second behavior group, such as a non-compliant user during peak hours behavior group. In this example, the analytics module 108 may dynamically update the behavior group tag associated with the user identifier and push the updated mapping to the edge device 112 in real-time. Accordingly, the analytics module may perform an analysis of the bandwidth usage pattern of each user, apply predictive analytic metrics, and determine forecasts of not just the user bandwidth usage but also about the overall traffic conditions such as peak hours of use. The analytics module may use the forecasts and real-time flow data of users to initially map a user to a behavior group and/or to dynamically re-assign the user between behavior groups.

The controller 104 may be configured to communicate with the one or more edge device(s) 112. For instance, the controller 104 may be configured to send policy(ies) 126 and/or behavior group data 130 to edge device(s) 112. In some examples, policy(ies) 126 comprise policies configured by the management module 106. As noted above, policy(ies) 126 may comprise one or more separate application aware policy(ies), user aware policy(ies), and/or user behavior aware policy(ies). In some examples, the policy(ies) 126 may comprise a single integrated policy that incorporates the application aware, user aware, and user behavior aware policies. In some examples, the behavior group data 130 may comprise user to behavior group mappings generated by analytics module 108. In some examples, the controller 104 may send security group data. For instance, authentication system 110 may send security group data 124, which may comprise a user to identity group mapping (e.g., the SGT tag) associated with the user and/or user device 114. As used herein, "security group" corresponds to "identity group" described above and below.

For instance, the controller 104 may receive flow data (e.g., network traffic load data, network client data, etc.) or other data (e.g., application load data, data associated with WLCs, APs, etc.) from the edge device(s) 112. In some examples, the controller 104 is configured to receive data (e.g., user data 122, flow data 128, etc.) from the edge device(s) 112. User data 122 may comprise user authentication data, such as user credentials, user device identifiers (e.g., such as an IP address, etc.), or any other user data. Flow data 128 may comprise one or more application characteristics and/or network characteristics. The application characteristics may comprise one or more of flow telemetry (e.g., an application identifier, flow count—how many flows is the application creating, bytes, octets, bandwidth requirements, a number of users that access the application, drops, event(s) associated with the drops, DSCP markings); interface data (e.g., bandwidth utilization, total octets, packet(s), maximum supported line rate, tail drops, etc.); link characteristics (e.g., internet service provider (ISP) name, purchased bandwidth or available maximum bandwidth, link type (e.g., MPLS, Internet, LTE, etc.), geographic region, etc.); quality of service (QoS) prioritization requirements (e.g., low latency queuing, bandwidth reservation, etc.); application quality metrics (e.g., application performance index, application telemetry, application feedback, etc.); and/or any other suitable data or characteristic.

The edge device(s) 112 may comprise routers, switches, access points, stations, radios, or any other network device. In some examples, the edge device(s) 112 may monitor application flow(s) within the network and may report information associated with the traffic flow(s) to the controller 104. For instance, the controller 104 may be configured to send policy(ies) 126 to the edge device(s) 112. In some examples, the policy(ies) 126 comprise the AAR policy(ies), identity aware policies, user behavior aware policies, network polices, quality of service policies, prioritization policies, or any other policy.

The edge device(s) 112 may comprise classification module 132, propagation module 134, and/or enforcement module 136. In some examples, the classification module 132, propagation module 134, and/or enforcement module 136 may correspond to Cisco's Trustsec integration with SD-WAN. For instance, the edge device(s) 112 may comprise Trustsec enabled router(s). In some examples, one or more of the classification module 132, propagation module 134, and/or enforcement module 136 be implemented on any network device (e.g., switches, firewalls, etc.) within system 100.

Classification module 132 may be configured to authenticate the user with the authentication system. For instance, the classification module may authenticate the user of a user device when the users are admitted into the network (e.g., such as by using 802.X or Remote-Access). As noted above, the authentication engine may assign each user an identity tag based on the users' authenticated identity (e.g., role within an organization, job functionalities, etc.) and/or context. The classification module may be configured to receive and store the mappings of user device identifiers, identity tags, and/or behavior group tags.

Propagation module 134 may be configured to include the assigned identity tag (e.g., SGT tag) and/or behavior group tag in packets of flow data that are originated by the user device of the user.

Enforcement module 136 may be configured to enforce security policies and routing polices based on the identity tag (e.g., SGT tag) and/or behavior group tag. For instance, the enforcement module may utilize SGT-aware access-lists, SGT-aware firewalls, SGT-aware Policy Based Routing (PBR), and SGT-aware SD-WAN policies.

In some examples, the edge device(s) 112 may enforce the application aware policies and identity aware policies using the user device identifier (e.g., user-IP address) to identity tag (e.g., SGT tag) mapping from the authentication system 110 and/or from the identity tag included in packet(s) of the flow data. In some examples, the edge device(s) 112 may enforce the behavior aware policies using the user device identifier to behavior group mapping(s) received and/or updated from the system. For instance, the edge device(s) 112 may identify and apply a user behavior aware policy based on the identity tag and the user-IP address to behavior group mapping. For instance, as described in greater detail below, the enforcement module 136 may cause user traffic associated with the user device 114 to be dropped, allowed over a best path, diverted to a best-effort path, etc., based on a behavior group the user is mapped to.

In some examples, the controller 104 is configured to receive data (e.g., user data 122, flow data 128, etc.) from the edge device(s) 112. User data 122 may comprise user authentication data, such as user credentials, user device identifiers (e.g., such as an IP address, etc.), or any other user data.

In some examples, the system comprises branch(es) 138. In some examples, the branch(es) 138 comprise user(s), mobile device(s), and/or Internet of Things (IoT) device(s) located at one or more locations. In some examples, the branch(es) 138 may comprise one or more network device(s) (e.g., switch(es), firewall(s), etc.) and/or user device(s) 114 that may communicate with the network(s) 102 via edge device(s) 112. In some examples, the branch(es) 138 comprise switches that are enabled to perform classification, propagation, and enforcement. For instance, the switch(es) may correspond to Cisco's Trustsec enabled switches. In some examples, the branch(es) 138 correspond to one or more WAN network(s).

In some examples, the edge device(s) 112 comprise one or more routers, access point(s), or any other network device. In some examples, the edge device(s) 112 may comprise an ingress and/or egress router. In some examples, the edge device(s) 112 may comprise a SDCI router and/or headend device. In some examples, the branch(es) 138 communicate with each other, the controller 104, or cloud providers (e.g., SaaS, Internet, IaaS, etc.) via the network(s) 102. In some examples, the branches 138 comprise user device(s) 114. User device(s) 114 may correspond to any computing device, mobile device, etc. of a user. As illustrated, user device(s) 114 may comprise application(s) 116. In some examples, application(s) 116 correspond to any application providing a functionality on the user device(s) 114. For instance, the application(s) 116 may correspond to email application(s), enterprise application(s), etc.

In some examples, the edge device(s) 112 may be configured to communicate with user device(s) 114 and/or application(s) 116. For instance, edge device(s) 112 may be configured to receive flow data 128 associated with user device(s) 114.

In some examples, the controller 104 may be configured to communicate with administrator device(s) 118. As illustrated, the administrator device(s) 118 may comprise an application 120. In some examples, the application 120 may correspond to an application provided by a service provider (e.g., such as Cisco) that enables an administrator of the network 102 to access the controller 104. For instance, the application 120 may correspond to Cisco's vAnalytics and/or Cisco's vManage feature.

At "1", the system may generate policy(ies) for user(s) based on application(s), identity group(s), and behavior group(s). For instance, the system may generate policy(ies) 126 using management module 106. As noted above, the policy(ies) 126 may include, but are not limited to, application aware policies, identity aware policies, and/or user behavior aware policies.

At "2", the system may send the policy(ies) to the edge device(s). For instance, the management module 106 may push the policy(ies) 126 to the edge device(s) 112. The edge device(s) 112 may store the policies 126 and use the policies and mapping(s) (e.g., identity tag, behavior group tag and/or mapping, etc.) when routing flow data 128.

At "3", the system may monitor flow data associated with user(s) and application(s). For instance, the system may receive flow data 128. As described above, the flow data 128 may include identifier tag(s), application identifier(s), user device identifier(s), mapping(s), behavior group tag(s), etc. As described above, the system may learn behavior of a particular user based on the flow data 128. For instance, the behavior may correspond to bandwidth usage patterns of the particular user within network 102. The system may also determine other policy(ies) associated with the user, such as application aware policies, security policies, identity aware policies, etc. For instance, the system may determine that the user is associated with an identity group that is allocated a certain amount of bandwidth within the network.

At "4", the system may dynamically map user(s) to behavior group(s). For instance, the system may map a user device identifier (e.g., user-IP address) to a behavior group identifier (e.g., behavior group tag) based on the user's forecasted behavior, network conditions, and/or real-time bandwidth usage. For instance, a user may initially be assigned to a first behavior group based on bandwidth usage patterns learned by analytics module 108. The system may determine based on real-time bandwidth usage, traffic conditions, etc., to re-assign the user to a second behavior group. The system may push the updated mapping to the edge device(s) 112, such that policy(ies) configured for the second behavior group may be enforced for the user dynamically and in real-time.

At "5", the system may send mapping(s) to edge device(s) 112. For instance, the system may send the mapping(s) to edge device(s) 112 via the controller 104. In some examples, the system may push the mapping(s) to the edge device(s) 112 in real-time.

In this way, the system may extend application aware and identity aware policies to incorporate user behavior aware policies, thereby providing finer granularity to AAR techniques. Moreover, the system may intelligently and dynamically map user(s) to different behavior group(s), such that behavior of the user can no longer detrimentally impact other user(s) within a particular identity group. That is, the system may apply dynamic user behavior and the current network traffic conditions, network traffic forecast to user(s) and, based on the user behavior aware policies, cause user traffic to be dropped, allowed over best path, or diverted to best-effort path. In this way, the system provides improved network and application experience to user(s) within identity groups by preventing the behavior of one or few users from negatively impacting application quality, network quality, etc.

Figure 2:
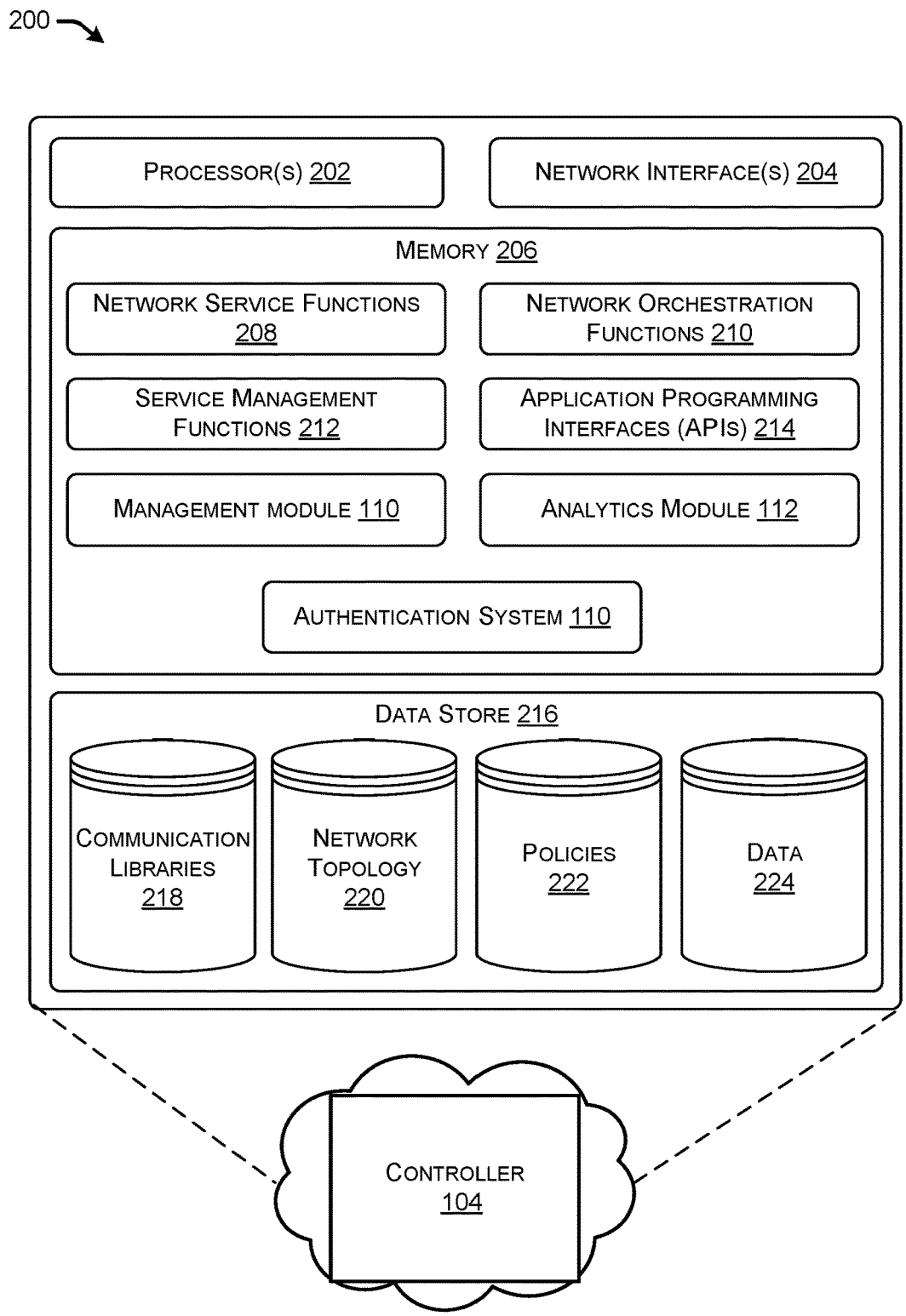
FIG. 2 illustrates a component diagram of an example controller, as described in FIG. 1.

FIG. 2 illustrates a component diagram 200 of an example controller described in FIG. 1. In some instances, the controller 104 may run on one or more computing devices in, or associated with, the network(s) 102 (e.g., a single device or a system of devices) and/or system 100. In some instances, the controller 104 may be integrated as part of a cloud-based management solution (e.g., such as Cisco's vAnalytics feature, and/or Cisco's vManage feature).

Generally, the controller 104 may include a programmable controller that manages some or all of the control plane activities of the network 102, and manages or monitors the network state using one or more centralized control models.

As illustrated, the controller 104 may include, or run on, one or more hardware processors 202 (processors), one or more devices, configured to execute one or more stored instructions. The processor(s) 202 may comprise one or more cores. Further, the controller 104 may include or be associated with (e.g., communicatively coupled to) one or more network interfaces 204 configured to provide communications with edge device(s) 112 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The controller 104 may also include memory 206, such as computer-readable media, that stores various executable components (e.g., software-based components, firmware-based components, etc.). The memory 206 may generally store components to implement functionality described herein as being performed by the controller 104. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the controller 104.

The controller 104 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the controller 104 may include management module 106. As described above, in some examples, management module 106 may correspond to Cisco's vManage feature. In some examples, the management module is configured to define one or more AAR policies, identity aware policies, and/or user behavior aware policies. In some examples, the management module 106 may be configured to define behavior groups. For instance, the user behavior groups may be defined as part of a user behavior aware policy. User behavior aware policies may define one or more behavior groups associated with behavior patterns of users within groups defined by the user aware policies. For instance, an administrator of the enterprise network may define, for users identified as belonging to the accounting department, two behavior groups associated with behavior patterns of individual users. The user behavior aware policies may further define restrictions associated with bandwidth usage, etc., based on the behavior group the user is mapped into, network traffic patterns (e.g., whether it is peak hours of user or not), or any other parameter. In some examples, user behavior groups may comprise compliant user(s) and non-compliant user(s). In some examples, user behavior groups may comprise compliant user(s) during peak hours, compliant user(s) during non-peak hours, non-compliant user(s) during peak hours, and non-compliant users during non-peak hours. It is understood that any type of behavior group may be defined by a network administrator, such that the techniques described herein are not limited to the examples described. In some examples, the management module may be configured to send the policies and/or the application models to devices (e.g., edge devices, network devices, etc.) within the network.

The controller 104 may include analytics module 108. As described above, the analytics module may comprise an analytics engine. In some examples, the analytics module may correspond to Cisco's vAnalytics feature. As described herein, the analytics module 108 may be configured to perform an analysis of the bandwidth usage pattern of each user, apply predictive analytic metrics, and determine forecasts of not just the user bandwidth usage but also about the overall traffic conditions such as peak hours of use. The analytics module may use the forecasts and real-time flow data of users to initially map a user to a behavior group and/or to dynamically re-assign the user between behavior groups.

As an example, the analytics module 108 may initially identify and map a user to a "non-compliant" user behavior group, indicating that the behavior pattern of the user tends to violate one or more of policy(ies) 126. In this example, the management module 106 may assign an identity tag to the user device after the user is initially mapped to the non-compliant user behavior group. In this example, the analytics module 108 may receive flow data from the network and may monitor behavior of the user within the particular identity group (e.g., SGT group) assigned to the user. Based on the user's real-time behavior, the analytics module 108 may re-map the user to a compliant user behavior group, thereby providing the user with a best link and/or network pathway. In some examples, such as where the user behavior continues to be non-compliant, the analytics module 108 and/or edge device 112 may limit the bandwidth available to the user device 114, such as by providing a non-prioritized link, blocking network traffic, and/or dropping network traffic.

The controller 104 may include authentication system 110. In some examples, the authentication system corresponds to an authentication, authorization, and access engine, such as Cisco's Identity Services Engine (ISE). In some examples, the authentication system is configured to receive user data (e.g., such as user credentials when accessing an enterprise network) from the user device and/or via an edge device. The authentication system may authenticate the user data by comparing the user data to data stored by the authentication system. Where the user data matches, the authentication system may assign an identity tag to the user based on a role and/or group associated with the user and identified by the authentication system. In some examples, identity tags correspond to Security Group Tags (SGTs). In some examples, the authentication system may assign the identity tag based on context, such as user device type, security posture, user location, etc. For instance, a user within a management department of an enterprise network may be assigned an identity tag that associates the user device with the management group. The authentication system may send a message to an edge device associated with the user device. The message may comprise the mapping between the user device and the identity tag. For instance, the message may comprise a mapping between an IP address of the user device and the identity tag. The message may further indicate the user data has been authenticated and the user device may access the network.

The controller 104 may further include a data store 216, such as long-term storage, that stores communication libraries 218 for the different communication protocols that the controller 104 is configured to use or perform. Additionally, the data store 216 may include network topology data 220, such as a model representing the layout of the network components in the network 102 and/or data indicating available bandwidth, available CPU, delay between nodes, computing capacity, processor architecture, processor type (s), etc. The data store 216 may store policies 222 that includes AAR policies, identity aware policies, user behavior aware policies, security data associated with the network, security policies configured for the network, firewall policies, firewall configuration data, security posture data, and/or compliance policies configured for the network. The data store 216 may store data 224 that include flow data, network data, user data, behavior model(s), application model(s), impact analysis data, and/or any other data described herein.

Figure 3:
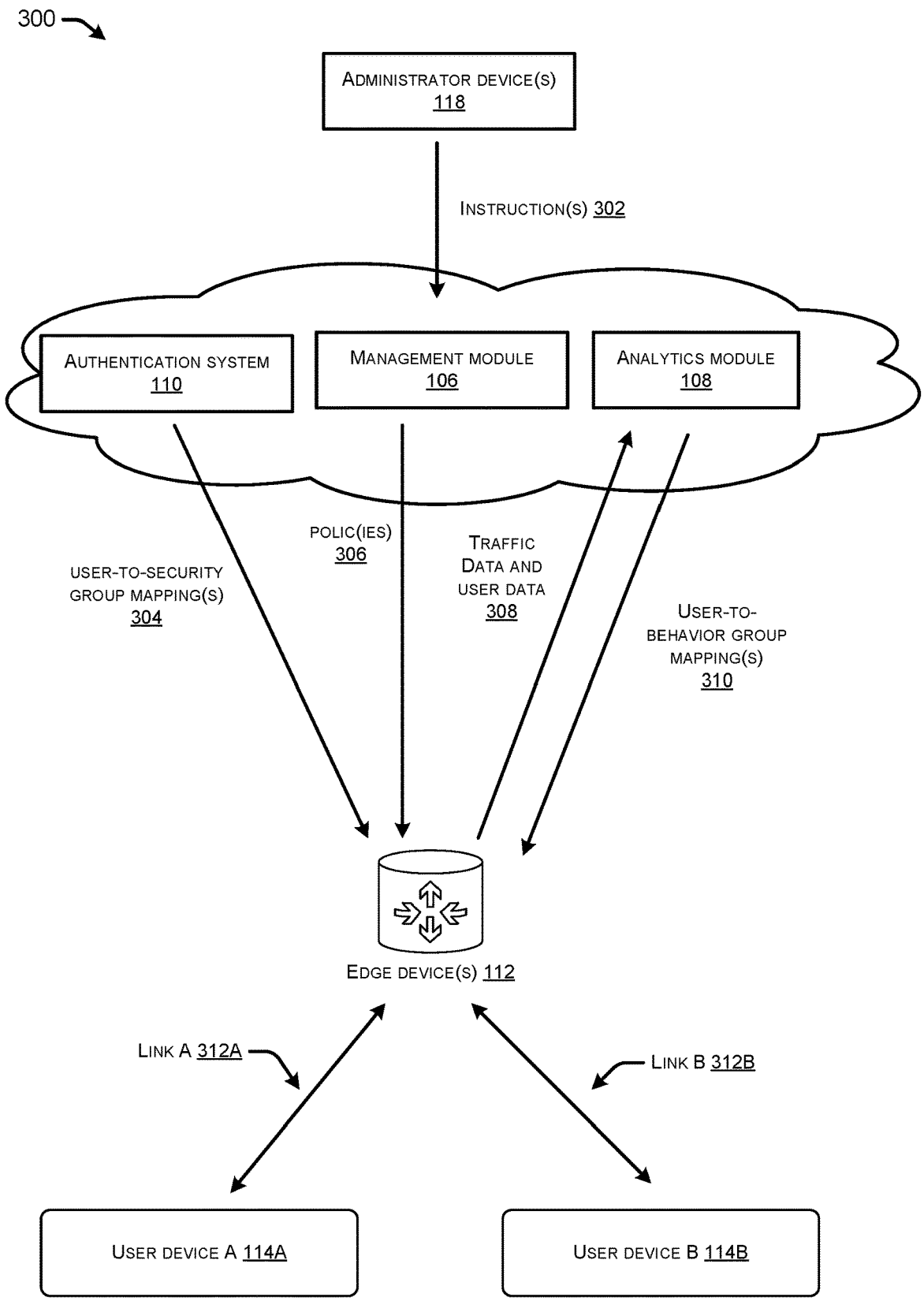
FIG. 3 an example environment and inputs and outputs between the components described in FIGS. 1-2.

FIG. 3 illustrates an example environment 300 showing exemplary inputs and outputs between the components described in FIGS. 1-2. In some examples, the environment 300 may be associated with system 100 described in FIG. 1 herein.

As illustrated, the environment 300 may include management module 106, analytics module 108, authentication system 110, edge device(s) 112, administrator device(s) 118, and user device(s) 114, as described in FIG. 1. In some examples, one or more of the authentication system 110, management module 106, and/or the analytics module 108 may be implemented as part of a cloud-based service. In some examples, one or more of the authentication system 110, management module 106, and/or the analytics module 108 may be implemented by one or more devices (e.g., network devices, edge device(s), controller(s), etc.).

In the illustrated environment 300, administrator device(s) 118 may send instruction(s) 302 to management module 106. For instance, the instruction(s) 302 may be associated with configuring one or more policy(ies) 126 for an enterprise network. As described above, the management module 106 may be configured to define policies that are application aware, user aware (e.g., identity aware), and user behavior aware. As an example, an integrated policy may define, but is not limited to the following:

User-ID: Employee
Application: Video-call.
Behavior-Groups: (1) Compliant-User-Peak-Hour (C-P); (2) Compliant-User-Non-Peak-Hour (C-NP); (3) Non-Compliant-User-Peak-Hour (NC-P); (4) Non-Compliant-User-Non-Peak-Hour (NC-NP).

In this example, the integrated policy would apply where an identity tag indicates that the user is an "employee" and wherein the application identifier indicates the flow data is from a "video-call" application. In this example, user(s) falling within the identity group of "employee" and is using the "video-call" application, may be mapped to one of the four behavior groups defined. Additionally, each of the behavior groups defined in the policy may be associated with a corresponding action. For instance, the policy may further define that the "compliant-user-peak-hour" behavior group is given a prioritized network link (e.g., such as MPLS), that the "non-compliant user non-peak-hour" behavior group is given a non-prioritized network link (e.g., such as Internet), that the "non-compliant-user-peak-hour" behavior group will have traffic blocked and/or dropped, etc.

As described above, the management module 106 may push policy(ies) 306 to edge device(s) 112. For instance, policy(ies) 306 may include policy(ies) 126. In some examples, policy(ies) 306 and/or policy(ies) 126 comprise the integrated policies described herein.

In the illustrated environment 300, the authentication system 110 may send user-to-security group mapping(s) 304 to edge device(s) 112. For instance, the user-to-security-group mapping(s) 304 may be sent to the edge device(s) 112 in response to authenticating user device A 114A and/or user device B 114B. As described above, the user-to-security group mapping(s) 304 may comprise a mapping between an identifier of user device A 114A and the identity tag associated with the user. For instance, the user-to-security group mapping 304 for user device A 114A may comprise a mapping between an IP address of user device A 114A and the identity tag value indicating the user of user device A 114A is an "employee". In another example, the user-to-security group mapping 304 for user device B 114B may comprise a mapping between an IP address of user device B 114B and the identity tag value indicating the user of user device B 114B is a "manager".

In the illustrated environment 300, edge device(s) 112 may send traffic data and user data 308 to analytics module 108. For instance, the traffic data and user data 308 may comprise flow data 128 originating from one or more user device A 114A and/or user device B 114B. As described above, the flow data 128 may include identity tag(s), user device identifier(s), application identifier(s), etc.

As described herein, analytics module 108 may monitor the traffic data and user data 308 and may learn user behavior patterns associated with user(s) of user device A 114A and/or user device B 114B. As described above, the analytics module 108 has access to traffic flowing across the SD-WAN fabric (e.g., network(s) 102), applications, as well as users. Analytics module 108 may use the flow data to analyze and determine the bandwidth usage pattern of each user, apply predictive analytics, and generate forecasts of not just the user bandwidth usage but also about the overall traffic conditions of the network (e.g., such as peak hours of use, etc.). Thus, the analytics module 108 may not only dynamically track how a particular user behaves, but may also determine whether the user is violating any of the policy(ies) 126.

As an example, the analytics module 108 may initially identify and map a user to a "non-compliant" user behavior group, indicating that the behavior pattern of the user tends to violate one or more of policy(ies) 126. In this example, the management module 106 may assign an identity tag to the user device 114 after the user is initially mapped to the non-compliant user behavior group. In this example, the analytics module 108 may monitor flow data from the network and may monitor behavior of the user within the particular identity group (e.g., SGT group) assigned to the user. Based on the user's real-time behavior, the analytics module 108 may re-map the user to a compliant user behavior group, thereby providing the user with a best link and/or network pathway. In some examples, such as where the user behavior continues to be non-compliant, the analytics module 108 and/or edge device 112 may limit the bandwidth available to the user device 114, such as by providing a non-prioritized link, blocking network traffic, and/or dropping network traffic.

Analytics module 108 may send user-to-behavior group mapping(s) 310 to edge device(s) 112. For instance, the user-to-behavior group mapping(s) 310 may indicate a first mapping associated with user device A 114A and/or a second mapping associated with user device B 114B. As an example, user behavior groups may be defined as the following groups: Compliant-User-Peak-Hour (e.g., users that are compliant with policy(ies) 126 during peak hour(s) of network traffic), Compliant-User-Non-Peak-Hour (e.g., users that are non-compliant with one or more policy(ies) 126 during non-peak hour(s) of network traffic), Non-Complaint-User-Peak-Hour (e.g., users that are non-compliant with one or more policy(ies) 126 during non-peak hour(s) of network traffic), Non-Compliant-User-Non-Peak-Hour (e.g., users that are non-compliant with one or more policy(ies) 126 during non-peak hour(s) of network traffic), etc. In some examples, fewer user behavior groups may be utilized. For instance, user behavior groups may be defined as Compliant-User and Non-Compliant-User. In some examples, the network administrator may define any number of user behavior groups, which may be based on any characteristic of user behavior, network conditions, or any other suitable factor.

As noted above, the analytics module 108 may monitor flow data and may determine that the observed/predicted user behavior and other network conditions change. Accordingly, the analytics module 108 may dynamically re-map (e.g., re-assign) a user to a different behavior group. The analytics module 108 may push the updated user-to-behavior group mapping(s) to the edge device(s) 112 for enforcement in real-time. In some examples, the analytics module 108 may push the updated user-to-behavior group mapping(s) 310 to the management module 106 and/or the edge device(s). In some examples, the management module 106 may dynamically update the policy(ies) applied to the user. In some examples, the management module 106 may dynamically update the policy(ies) applied to the user at any time (e.g., independent of the user being mapped to a new user behavior group).

In the illustrated environment, edge device(s) 112 may apply policy(ies) 306 based on the user-to-behavior group mapping(s) 310. As an example, the edge device 112 may perform one or more sequences in response to receiving the user-to-behavior group mapping(s) 310 with respect to link(s) (e.g., link A 312A and/or link B 312B) to user device(s) (e.g., user device A 114 and/or user device B 114B). For instance, a first sequence may comprise:

Match ((User==Employee) AND (App==Video-call) AND (Behavior-Group==Compliant-User))
Action (Allow, Path=MPLS)

In this example, the edge device 112 may determine that, where user device A 114A is associated with a user that is an employee, is using a video-call application, and is mapped to the "compliant-user" behavior group, then the edge device 112 will allow flow data from user device A 114A via a prioritized link (e.g., link A 312A, MPLS pathway).

A second sequence of applying the exemplary policy may include as follows:

Match ((User==Employee) AND (App==Video-call) AND (Behavior-Group==Non-Compliant-User-Non-Peak-Hour))
Action (Allow, Path=Internet)

In this second sequence example, the edge device 112 may determine that, where user device A 114A is associated with a user that is an employee, is using a video-call application, and is mapped to the "non-compliant-user-non-peak-hour" behavior group, then the edge device 112 will perform action(s) that allow flow data from the user device A 114A via a link (e.g., link A 312A), but the link will not be a prioritized link. In this example, link A 312A may comprise an Internet pathway.

A third sequence example may include as follows:

Match ((User==Employee) AND (App==Video-call) AND (Behavior-Group==Non-Compliant-User-Peak-Hour))
Action (Block/Drop traffic)

In this example, the edge device 112 may determine that, where user device A 114A is associated with a user that is an employee, is using a video-call application, and is mapped to the "non-compliant-user-peak-hour" behavior group, then the edge device 112 will block traffic from being received from user device A 114A via link A 312A and will drop flow data originating from user device A 114A.

Accordingly, edge device(s) 112 may enforce the application aware, identity aware, and behavior group aware policies using the user-IP address to identity tag (e.g., SGT tag) mapping from the authentication system 110, as well as the user-IP address to behavior group mapping received from and/or updated by the analytics module 108.

In this way, the system may enable user-aware policies that also account for the dynamic user behavior patterns (e.g., such as bandwidth usage under different link load conditions, etc.). Thus, by extending user aware policies to incorporate user behavior groups and dynamically monitoring and mapping user(s) to behavior group(s) in real-time, the described techniques may prevent a single user or a few users from impacting application experience, network quality, etc. of other users within an identity group. Further, by preventing application experience, network quality, etc., of user(s) within identity groups from being impacted, the techniques described herein improve the efficacy of application aware and user aware policies.

Figure 4:
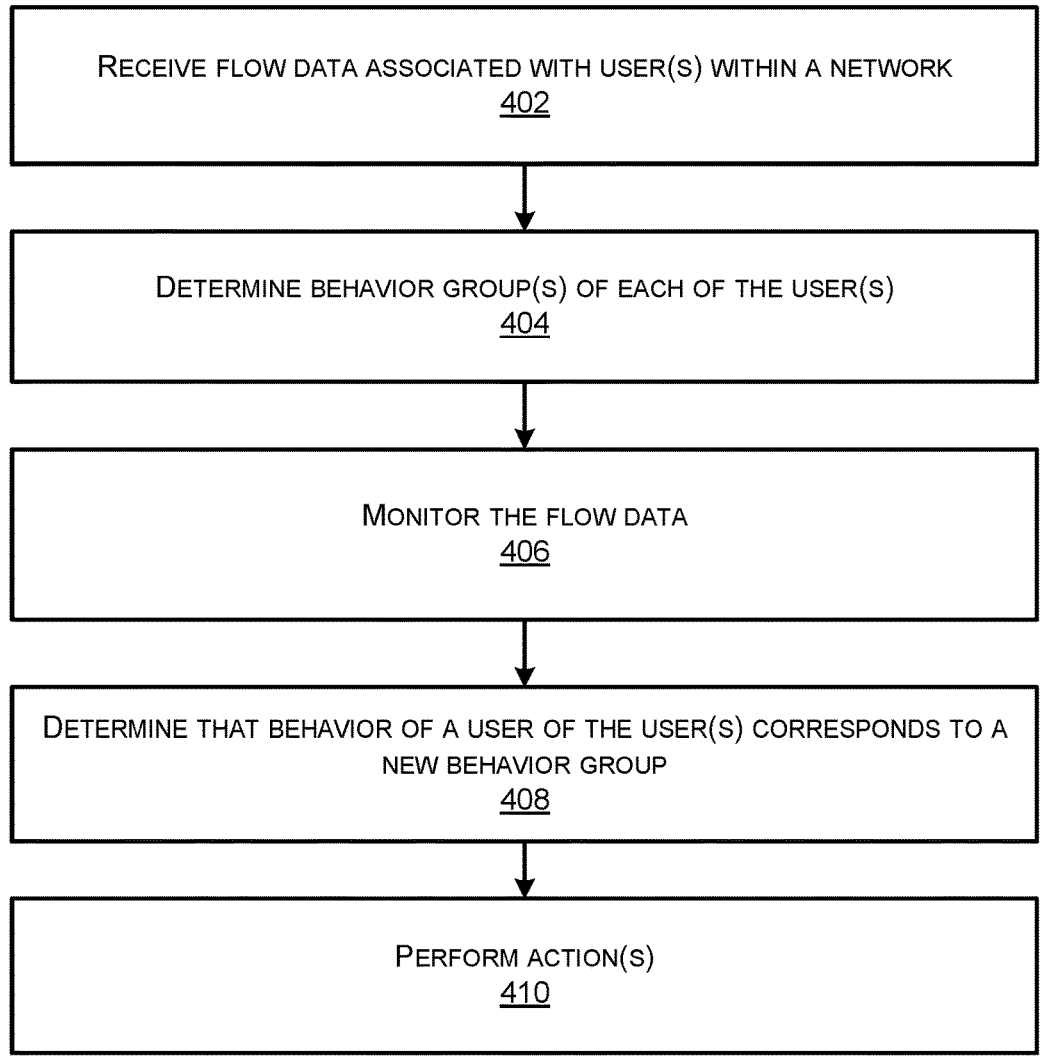
FIG. 4 illustrates a flow diagram of an example system for providing dynamic user behavior aware policies in SD-WAN, in accordance with the techniques described in FIGS. 1-3.

FIG. 4 illustrates a flow diagram of an example system 400 for providing dynamic user behavior aware policies in SD-WAN, in accordance with the techniques described in FIGS. 1-3. In some instances, one or more of the steps of system 400 may be performed by one or more devices (e.g., controller 104, edge device(s) 112, etc.) that include one or more processors and one or more non-transitory computer-readable media storing computer-executable instructions that, when executed by the one or more processors, cause the one or more processors to perform operations of system 400. In some examples, the system 400 may be performed by a controller 104 within a SD-WAN.

At 402, the system may receive flow data associated with user(s) within a network. For instance, the network may comprise network(s) 102. In some examples, the network comprises an enterprise network and/or a SD-WAN. In some examples, the flow data 128 is associated with a plurality of users. As described above, the flow data 128 may be received by the controller 104. In some examples, the flow data comprises an application identifier, a user identifier, an identity group tag, and a behavior group tag.

At 404, the system may determine behavior group(s) of each of the user(s). For instance, the system may receive the flow data 128 and learn user behavior pattern(s) and/or network traffic pattern(s) as described herein. In some examples, the behavior group(s) and/or user of the user device is associated with an identity group (e.g., such as SGT tags). In some examples, the behavior group(s) correspond to user behavior groups described herein, which may be defined in one or more user behavior aware policy(ies).

In some examples, the system may determine, based at least in part on the flow data, one or more of bandwidth usage patterns for each user of a plurality of users. The system may determine, based at least in part on the flow data, one or more traffic conditions associated with the network. The system may assign, based at least in part on the respective bandwidth patterns, one or more traffic conditions, and one or more network policies, each user to a respective behavior group. In some examples, the one or more traffic conditions comprise peak hours of use, link load characteristics, quality of service requirements, and SLA requirements associated with applications.

In some examples, the system may generate, based at least in part on the flow data, predictive analytic data associated with each user of the plurality of users. For instance, the system may utilize the analytics module 108 described above to generate predictive bandwidth usage associated with the user and/or other characteristics of the user, historic data, etc. As noted above, the system may utilize machine learning model(s). In some examples, the system may assign, based at least in part on the predictive analytic data or historic data, the first user to the first behavior group. For instance, where bandwidth usage patterns of a user indicate the user is generally in compliance with policy(ies) 126, the system may map the user to a "compliant-user" user behavior group and send the mapping to edge device(s) 112.

At 406, the system may monitor the flow data. For instance, the system may continue to receive flow data within the network. In some examples, a user may authenticate with authentication system 110 and access the network. In this example, the user may be mapped to a first user behavior group.

At 408, the system may determine that behavior of one or more of the user(s) corresponds to a new behavior group. For instance, as described herein, the analytics module 108 may monitor user(s) and/or particular identity group(s) associated with the user(s) to determine a user's real-time behavior. As an example, where the previously compliant user begins to behave in a non-compliant manner (e.g., such as violating a network policy, hogging bandwidth, etc.), the system may determine the user's current behavior is that of a "non-compliant" user based on the user behavior aware policies.

At 410, the system may perform action(s). For instance, the system may map the user to the new behavior group and may push the updated mapping to edge device(s) for enforcement in real-time. In some examples, the system may assign, based at least in part on determining the behavior corresponds to the second behavior group, the user to the second behavior group. In some examples, assigning the user to the second behavior group comprises mapping an IP address associated with a device of the user to the second behavior group and an application identifier. In some examples, the system may send, to the one or more edge devices, a message indicating the user is assigned to the second behavior group. In some examples, the first behavior group corresponds to a first set of network policies and the second behavior group corresponds to a second set of network policies.

In some examples, the system may generate first policies defining one or more identity groups within the network. In some examples, the system may generate second policies defining one or more behavior groups for each of the one or more identity groups (e.g., security groups) within the network. In some examples, the system may send, to one or more edge devices, the first policies and the second policies. In some examples, the first policies define a mapping between a user identifier of the user and an identity tag, and wherein the second policies define one or more behavior groups, the one or more behavior groups including the first behavior group and the second behavior group.

Figure 5:
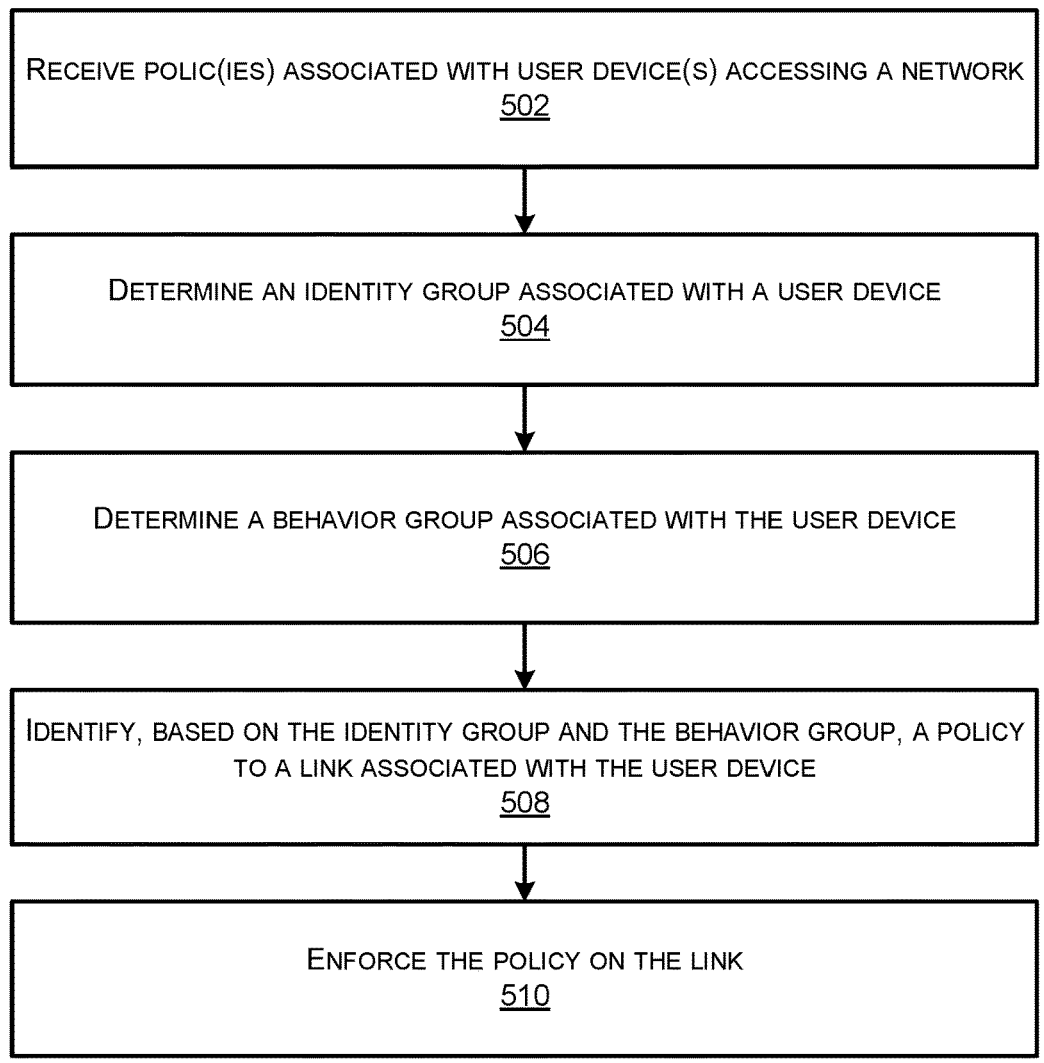
FIG. 5 a flow diagram of an example system for enforcing dynamic user behavior aware policies in SD-WANs using behavior groups, in accordance with the techniques described in FIGS. 1-4

FIG. 5 illustrates a flow diagram of an example system 500 for enforcing dynamic user behavior aware policies in SD-WANs using behavior groups, in accordance with the techniques described in FIGS. 1-4. In some instances, one or more of the steps of system 500 may be performed by one or more devices (e.g., controller 104, edge device(s) 112, etc.) that include one or more processors and one or more non-transitory computer-readable media storing computer-executable instructions that, when executed by the one or more processors, cause the one or more processors to perform operations of system 500. In some examples, the system 500 may be performed by an edge device 112 within a SD-WAN.

At 502, the system may receive policy(ies) associated with user device(s) accessing a network. For instance, the edge device(s) 112 may receive policy(ies) 126 from management module 106. As descried herein the policy(ies) may comprise security policies, network policies, application aware policies, user aware policies, user behavior aware policies, or any other policy. In some examples, the flow data may be associated with a plurality of users associated with the user device(s). As described herein, the network may comprise an enterprise network. In some examples, the network may correspond to an SD-WAN.

At 504, the system may determine an identity group associated with a user device. For instance, the system may receive a user device identifier to identity group mapping (e.g., the user-IP address to identity tag). As described above, the system may receive the mapping when a user device authenticates a user with the authentication system, such as when the user accesses the network, such as via VPN, etc.

At 506, the system may determine a behavior group associated with the user device. For instance, the behavior group may correspond to a user behavior group as described herein. In some examples, the system may determine the behavior group based on a user-to-behavior group mapping(s) 310 received from the analytics module 108. As described above, the analytics module 108 may map the user associated with the user device 112 to a first user behavior group at a time before the user is assigned an identity tag (e.g., before the user authenticates with the authentication system 110. The analytics module 108 may send the mapping(s) to the system, such that the system may store the initial mapping(s) for use when the user of the user device 112 accesses the network 102.

At 508, the system may identify, based on the identity group and the behavior group, a policy to a link associated with the user device. For instance, the system may access one or more of the policy(ies) 126. The system may identify a policy to apply to the user device based on one or more of an application identifier, user device identifier, identity group identifier, and/or behavior group identifier associated with the user and/or user device.

At 510, the system may enforce the policy. For instance, as described herein, each of the policy(ies) may be associated with an action. In some examples, the system may restrict bandwidth access to the user device, provide a prioritized link, block traffic, drop traffic, and/or any other appropriate action.

In some examples, the system may generate flow data using the enforcement module described herein. In some examples, the system may generate flow data associated with the user device and/or other user device(s) within the network. The system may send the flow data to the controller 104. For instance, where the system blocks and/or drops traffic associated with a particular user device, the system may refrain from generating flow data for a particular application being used by the user device. In this example, the system may block and/or drop traffic for other application(s) being used by the particular user device. Alternatively, the system may generate flow data for the other application(s) being used by the particular user device. In some examples, the system may generate the flow data based on the policy(ies) 126. In some examples, the flow data may comprise a user identifier associated with the user and/or user device identifier of the user device, an identity group identifier associated with the identity group, and a behavior group identifier associated with the behavior group.

In some examples, the system may receive an updated behavior group associated with the user device. For instance, the system may receive an updated mapping from the analytics module 108, indicating the user's real-time behavior maps to a different user behavior group. In some examples, the system may identify, in real-time and based on the updated behavior group, a second policy to the link associated with the user device. In some examples, the system may enforce the updated policy to the link. For instance, the system may restrict bandwidth access to the user device, provide a prioritized link, block traffic, drop traffic, and/or any other appropriate action. In some examples, the system may update the flow data to include an updated behavior group identifier associated with the updated behavior group.

Figure 6:
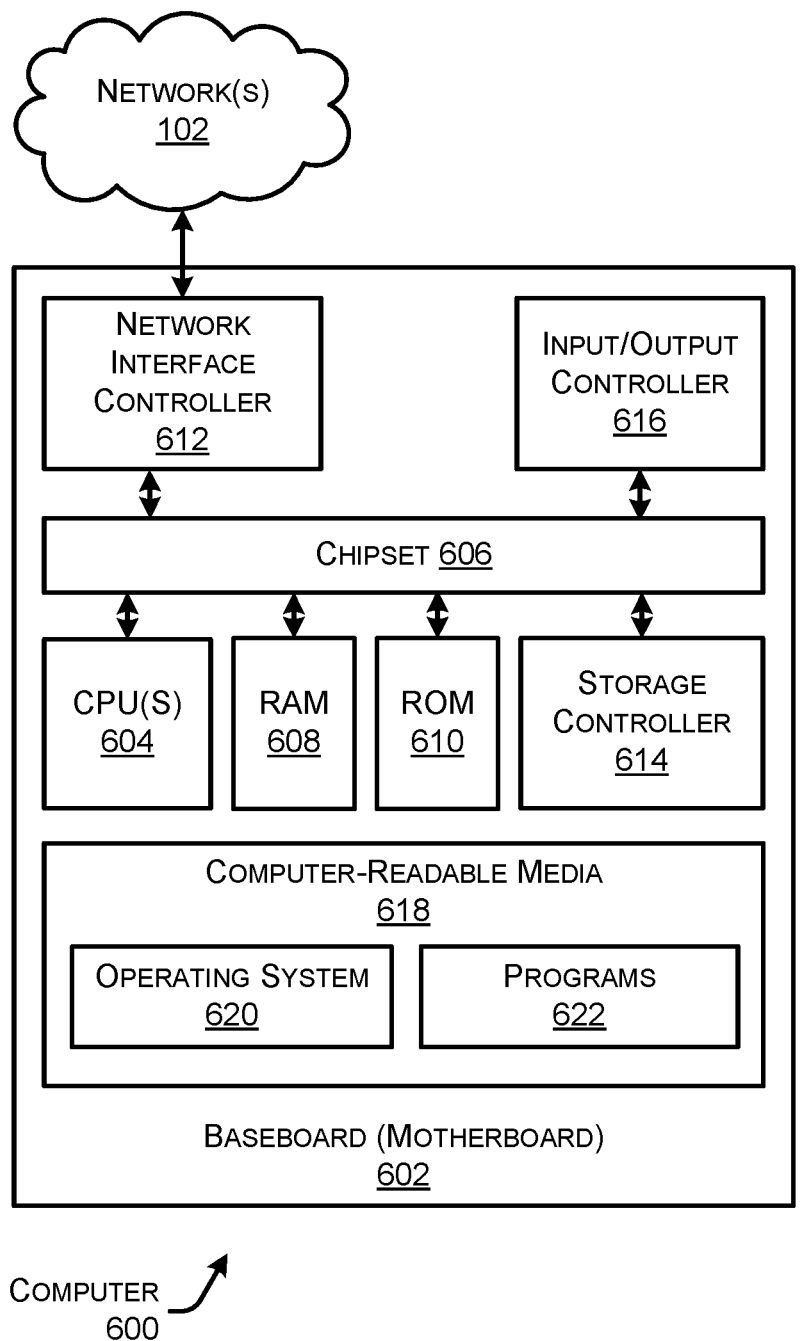
FIG. 6. is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a controller 104, edge device(s) 112, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network(s) 102. The chipset 606 can include functionality for providing network connectivity through a NIC 612, such as a gigabit Ethernet adapter. The NIC 612 is capable of connecting the computer 600 to other computing devices over the network(s) 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the controller 104, edge device(s) 112, and/or any components included therein, may be supported by one or more devices similar to computer 600. Stated otherwise, some or all of the operations performed by the controller 104, edge device(s) 112, and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a controller 104 and/or any other device. The computer 600 may include one or more hardware processors (processors, such as CPUs 604) configured to execute one or more stored instructions. The processor(s) may comprise one or more cores. Further, the computer 600 may include one or more network interfaces configured to provide communications between the computer 600 and other devices, such as the communications described herein as being performed by the controller 104 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques including receiving flow data received from the one or more edge devices of a network, the flow data being associated with a plurality of users; determining, based at least in part on the flow data, a user of the plurality of users as being associated with a first behavior group, the user also being associated with an identity group; monitoring the flow data associated with the plurality of users within the network; determining, based at least in part on monitoring the flow data, that behavior of the user corresponds to a second behavior group; assigning, based at least in part on determining the behavior corresponds to the second behavior group, the user to the second behavior group; and sending, to the one or more edge devices, a message indicating the user is assigned to the second behavior group.

The programs 622 may also cause the computer 600 to perform techniques including receiving, by an edge device, one or more policies associated with user devices accessing a network, the one or more policies defining one or more identity groups and one or more behavior groups; determining, by the edge device, an identity group associated with a user device; identifying, by the edge device, a behavior group associated with the user device; applying, by the edge device, a policy of the one or more policies to a link associated with the user device based on the identity group and the behavior group; and generating, by the edge device and based on applying the policy to the link, flow data comprising a user identifier, an identity group identifier associated with the identity group, and a behavior group identifier associated with the behavior group.

In this way, the computer 600 can extend application aware and identity aware policies to incorporate user behavior aware policies, thereby providing finer granularity to AAR and identity aware routing techniques. Moreover, the system may intelligently and dynamically map user(s) to different behavior group(s), such that behavior of the user can no longer detrimentally impact other user(s) within a particular identity group. That is, the system may apply dynamic user behavior and the current network traffic conditions, network traffic forecast to user(s) and, based on the user behavior aware policies, cause user traffic to be dropped, allowed over best path, or diverted to best-effort path. In this way, the system provides improved network and application experience to user(s) within identity groups by preventing the behavior of one or few users from negatively impacting application quality, network quality, etc.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving flow data received from one or more edge devices of a network, the flow data being associated with a plurality of users;
   determining, based at least in part on the flow data, a user of the plurality of users as being associated with a first behavior group, the user also being associated with an identity group;
   monitoring the flow data associated with the plurality of users within the network;
   determining, based at least in part on monitoring the flow data, that behavior of the user corresponds to a second behavior group;
   assigning, based at least in part on determining the behavior corresponds to the second behavior group, the user to the second behavior group; and
   sending, to the one or more edge devices, a message indicating the user is assigned to the second behavior group.

2. The method of claim 1, further comprising:
   generating first policies defining one or more identity groups within the network;
   generating second policies defining one or more behavior groups for each of the one or more identity groups within the network; and
   sending, to the one or more edge devices, the first policies and the second policies.

3. The method of claim 2, wherein the first policies define a mapping between a user identifier of the user and an identity tag, and wherein the second policies define the one or more behavior groups, the one or more behavior groups including the first behavior group and the second behavior group.

4. The method of claim 1, further comprising:
   generating, based at least in part on the flow data, predictive analytic data or historic data associated with each user of the plurality of users; and
   assigning, based at least in part on the predictive analytic data or historic data associated with the user, the user to the first behavior group.

5. The method of claim 1, wherein assigning the user to the second behavior group comprises mapping an IP address associated with a device of the user to the second behavior group.

6. The method of claim 1, wherein the flow data comprises an application identifier, a user identifier, an identity group tag, and a behavior group tag.

7. The method of claim 1, further comprising:
   determining, based at least in part on the flow data, one or more of bandwidth usage patterns for each user of the plurality of users;
   determining, based at least in part on the flow data, one or more traffic conditions associated with the network; and
   assigning, based at least in part on the respective bandwidth patterns, the one or more traffic conditions, and one or more network policies, each user to a respective behavior group.

8. The method of claim 7, wherein the one or more traffic conditions comprise peak hours of use, link load characteristics, quality of service requirements, and SLA requirements associated with applications.

9. The method of claim 1, wherein the first behavior group corresponds to a first set of network policies and the second behavior group corresponds to a second set of network policies.

10. A system comprising:
    one or more processors; and
    one or more computer-readable media storing instructions that, when executed by the one or more processors, cause the one or more processors to perform operations comprising:
    receiving flow data received from one or more edge devices of a network, the flow data being associated with a plurality of users;
    determining, based at least in part on the flow data, a user of the plurality of users as being associated with a first behavior group, the user also being associated with an identity group;
    monitoring the flow data associated with the plurality of users within the network;
    determining, based at least in part on monitoring the flow data, that behavior of the user corresponds to a second behavior group;

assigning, based at least in part on determining the behavior corresponds to the second behavior group, the user to the second behavior group; and sending, to the one or more edge devices, a message indicating the user is assigned to the second behavior group.

11. The system of claim 10, the operations further comprising:

generating first policies defining one or more identity groups within the network;

generating second policies defining one or more behavior groups for each of the one or more identity groups within the network; and sending, to the one or more edge devices, the first policies and the second policies.

12. The system of claim 11, wherein the first policies define a mapping between a user identifier of the user and an identity tag, and wherein the second policies define the one or more behavior groups, the one or more behavior groups including the first behavior group and the second behavior group.

13. The system of claim 10, the operations further comprising:

generating, based at least in part on the flow data, predictive analytic data associated with each user of the plurality of users; and assigning, based at least in part on the predictive analytic data, the user to the first behavior group.

14. The system of claim 10, wherein assigning the user to the second behavior group comprises mapping an IP address associated with a device of the user to the second behavior group.

15. The system of claim 10, wherein the flow data comprises an application identifier, a user identifier, an identity group tag, and a behavior group tag.

16. The system of claim 10, the operations further comprising:

determining, based at least in part on the flow data, one or more of bandwidth usage patterns for each user of the plurality of users;

determining, based at least in part on the flow data, one or more traffic conditions associated with the network; and assigning, based at least in part on the respective bandwidth patterns, the one or more traffic conditions, and one or more network policies, each user to a respective behavior group.

17. The system of claim 16, wherein the one or more traffic conditions comprise peak hours of use, link load characteristics, quality of service requirements, and SLA requirements associated with applications.

18. The system of claim 10, wherein the first behavior group corresponds to a first set of network policies and the second behavior group corresponds to a second set of network policies.

19. A method comprising:

receiving, by an edge device, one or more policies associated with user devices accessing a network, the one or more policies defining one or more identity groups and one or more behavior groups;

determining, by the edge device, an identity group associated with a user device;

identifying, by the edge device, a behavior group associated with the user device;

identifying, by the edge device, a policy of the one or more policies to a link associated with the user device based on the identity group and the behavior group; and enforcing, by the edge device and based on the policy, the policy to the link.

20. The method of claim 19, further comprising:

receiving, by the edge device, an updated behavior group associated with the user device;

identifying, in real-time and based on the updated behavior group, a second policy to the link associated with the user device; and enforcing, by the edge device, the second policy to the link.

* * * * *